United States Patent
Fay, II et al.

(10) Patent No.: US 12,532,809 B2
(45) Date of Patent: Jan. 27, 2026

(54) CONDITIONING ROLL TENSION CONTROL BY HEADER DRIVE PRESSURE

(71) Applicant: CNH Industrial America LLC, New Holland, PA (US)

(72) Inventors: Jeffrey Fay, II, Oxford, PA (US); Kevin Hanson, Akron, PA (US); Kevin Cordes, Glenmoore, PA (US); Samuel Anderson, Emlenton, PA (US)

(73) Assignee: CNH Industrial America LLC, New Holland, PA (US)

( * ) Notice: Subject to any disclaimer, the term of this patent is extended or adjusted under 35 U.S.C. 154(b) by 442 days.

(21) Appl. No.: 18/201,954

(22) Filed: May 25, 2023

(65) Prior Publication Data

US 2024/0389509 A1    Nov. 28, 2024

(51) Int. Cl.
*A01D 43/10* (2006.01)
*A01D 82/00* (2006.01)

(52) U.S. Cl.
CPC ......... *A01D 43/105* (2013.01); *A01D 43/102* (2013.01); *A01D 82/00* (2013.01)

(58) Field of Classification Search
CPC .... A01D 43/10; A01D 43/102; A01D 43/105; A01D 82/02; A01D 82/00
See application file for complete search history.

(56) References Cited

U.S. PATENT DOCUMENTS

| 4,546,599 A | 10/1985 | Cicci et al. |
| 5,845,469 A | 12/1998 | Koorn |
| 6,810,649 B2 | 11/2004 | Kempf |
| 6,996,961 B2 | 2/2006 | Nickel et al. |
| 7,467,505 B2 | 12/2008 | MacGregor |
| 7,730,701 B1 * | 6/2010 | Ehrhart ................. A01D 34/80 60/431 |

(Continued)

FOREIGN PATENT DOCUMENTS

| DE | 10030505 A1 | 1/2002 |
| EP | 0970597 B1 | 4/2004 |

(Continued)

OTHER PUBLICATIONS

The Extended European Search Report issued Oct. 28, 2024, by the European Patent Office in corresponding European Patent Application No. 24177831.5 (13 pages).

*Primary Examiner* — Joseph M Rocca
*Assistant Examiner* — Douglas J Meislahn
(74) *Attorney, Agent, or Firm* — Buchanan Ingersoll & Rooney PC (57) ABSTRACT

An agricultural crop conditioner comprising: a frame with a first conditioner roll rotatably mounted to the frame, and a second conditioner roll rotatably and movably mounted to the frame. A tensioner is connected between the frame and the second roll, and configured to generate a first force to bias the second roll towards the first roll. The conditioner has a roll drive circuit comprising a hydraulic pump configured to drive a hydraulic motor. A hydraulic actuator is operatively connected to a forward supply line between the pump and the motor. The hydraulic actuator is configured to change the first force as an inverse function of changes in a pressure of hydraulic fluid in the forward supply line during operation of the hydraulic motor in a forward processing direction.

15 Claims, 4 Drawing Sheets

(56) References Cited

U.S. PATENT DOCUMENTS

| | | | |
|---|---|---|---|
| 8,006,470 B2 | 8/2011 | Pruitt et al. | |
| 8,056,309 B2 | 11/2011 | Vandendriessche | |
| 8,656,694 B2 * | 2/2014 | Pruitt | A01D 43/105 |
| | | | 56/16.4 R |
| 9,648,809 B2 * | 5/2017 | Pruitt | A01D 43/102 |
| 10,506,762 B2 | 12/2019 | Glade et al. | |
| 10,806,078 B2 | 10/2020 | Rotole et al. | |
| 11,089,728 B2 | 8/2021 | Wire et al. | |
| 11,477,941 B2 | 10/2022 | Mortensen | |
| 2012/0185140 A1 * | 7/2012 | Kormann | A01D 43/085 |
| | | | 701/50 |
| 2018/0325032 A1 * | 11/2018 | Rotole | G05D 1/0278 |
| 2019/0029182 A1 * | 1/2019 | Glade | F15B 1/033 |
| 2020/0029503 A1 | 1/2020 | Nielsen | |
| 2020/0128735 A1 | 4/2020 | Bonefas et al. | |
| 2021/0360856 A1 | 11/2021 | Fay, II | |
| 2021/0360857 A1 | 11/2021 | Steidinger et al. | |

FOREIGN PATENT DOCUMENTS

| | | |
|---|---|---|
| FR | 3071128 A3 | 3/2019 |
| WO | 2019129334 A1 | 7/2019 |

\* cited by examiner

CONDITIONING ROLL TENSION CONTROL BY HEADER DRIVE PRESSURE

BACKGROUND OF THE INVENTION

Agricultural harvesting machines may include conditioners that crush, compress, tear, shred, or otherwise process crop material that is cut from the ground. For example, self-propelled windrowers or pull-type mower conditioners may include a conditioner in the form of two or more conditioning rolls that take in the crop material, condition it, and eject the conditioned crop material backwards along the vehicle's travel path (directly, or via a spreader or the like). Conditioners are used, for example, in processing hay, grass and other crop materials.

A typical self-propelled windrower includes a chassis, a prime mover, wheels, and a header. The header generally includes a cutter bar and a conditioner. The cutter bar can be a rotary cutter bar with rotating discs or a sickle-type cutter bar with reciprocating knives. A typical pull-type mower conditioner includes a frame, a hitch coupled to the towing vehicle, a cutter bar, and a conditioner mounted to the frame in a header-type manner. In either case, the equipment can also include other elements such as a reel to assist crop feeding, an auger or belts to convey crop to a central header inlet, a spreader to distribute the conditioned crop material, and so on.

The conditioner rolls are operated with a gap between them. The gap helps define the size of the crop mat that passes therethrough, and affects the overall results of the conditioning process. As the crop passes through the gap, the conditioning rolls apply opposing tangential forces that condition or otherwise crush the crop material. The extent of conditioning is based in part on the size of the gap and the tension holding the conditioning rolls in place to maintain the desired gap. In many cases, the roll tension is set at a fixed starting value, and is not changed while the harvesting machine is operated. In some cases, the selected tension setting might be suitable for certain crop conditions, but less than desirable for processing crop materials having varying properties. For example, the volume of crop entering the conditioner rolls can vary as a function of how the crop material is distributed on ground (i.e., larger volumes of crop material at some locations), and ground speed of the vehicle (i.e., the conditioner ingests material more rapidly). When this happens, the mat of crop material applies an increased force against the tensioner, which can result in excessive damage to the crop material, plugging, and other problems.

The inventors have determined that improvements can be made to conventional crop conditioners to address variations in crop material that are experienced during operation.

This description of the background is provided to assist with an understanding of the following explanations of exemplary embodiments, and is not an admission that any or all of this background information is necessarily prior art.

SUMMARY OF THE INVENTION

In a first aspect, there is provided an agricultural crop conditioner comprising: a frame; a first conditioner roll rotatably mounted to the frame; a second conditioner roll rotatably mounted to the frame and extending adjacent to the first conditioner roll, wherein the second conditioner roll is movable relative to the frame in a closing direction to decrease a size of a gap between the first conditioner roll and the second conditioner roll, and an opening direction to increase the size of the gap; a tensioner operatively connected between the frame and the second conditioner roll, and configured to generate a first force to bias the second conditioner roll in the closing direction; a conditioner roll drive circuit; and a hydraulic actuator. The conditioner roll drive circuit comprises: a hydraulic pump having a forward pump outlet and a reverse pump outlet, a hydraulic motor operatively connected at least one of the first conditioner roll and the second conditioner roll, and having a forward motor inlet and a reverse motor inlet, a forward supply line hydraulically connecting the forward pump outlet to the forward motor inlet, and a reverse supply line hydraulically connecting the reverse pump outlet to the reverse motor inlet. The hydraulic pump is operable to drive the hydraulic motor in a forward processing direction to process crop material through the crop conditioner. The hydraulic actuator has an actuator inlet operatively connected to the forward supply line, wherein the hydraulic actuator is configured to change the first force as an inverse function of changes in a pressure of hydraulic fluid in the forward supply line during operation of the hydraulic motor in the forward processing direction.

In another aspect, there is provided an agricultural machine having: a chassis; one or more wheels configured to support the chassis for movement on a ground surface; and an agricultural crop conditioner mounted on the chassis and constructed according to the first aspect describe above.

In another aspect, there is provided a method for operating an agricultural crop conditioner according to the first aspect described above. The method comprises: operating the hydraulic pump in the forward processing direction to rotate at least one of the first conditioner roll and the second conditioner roll to condition a flow of crop material moving in a downstream direction; applying the first force by the tensioner to bias the second conditioner roll in the closing direction; and operating the hydraulic actuator to inversely vary the first force as a function of a volumetric flow rate of the crop material.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide crop conditioning devices that may be used in agricultural equipment (e.g., mowers, windrowers, etc.), or in other environments. However, the invention is not limited to any particular application except as may be specifically recited in the claims.

The terms "forward," "rearward," "left" and "right," when used in connection with the agricultural harvester or mowing device and/or components thereof are usually determined with reference to the direction of forward operative travel, but they should not be construed as limiting. The terms "longitudinal" and "transverse" are determined with reference to the fore-and-aft direction of the agricultural vehicle or mowing device and are equally not to be construed as limiting. The terms "downstream" and "upstream" are determined with reference to the intended direction of crop material flow during operation, with "downstream" being analogous to "rearward" and "upstream" being analogous to "forward." The term "agricultural harvesting machine" may refer to any desired machine which cuts crop material from a field, such as a self-propelled windrower or a mower conditioner. The term "crop conditioning device" may refer to a roll-type conditioner that is usable in a self-propelled windrower, a pull-type mower conditioner, or any other desired machine.

Figure 1:
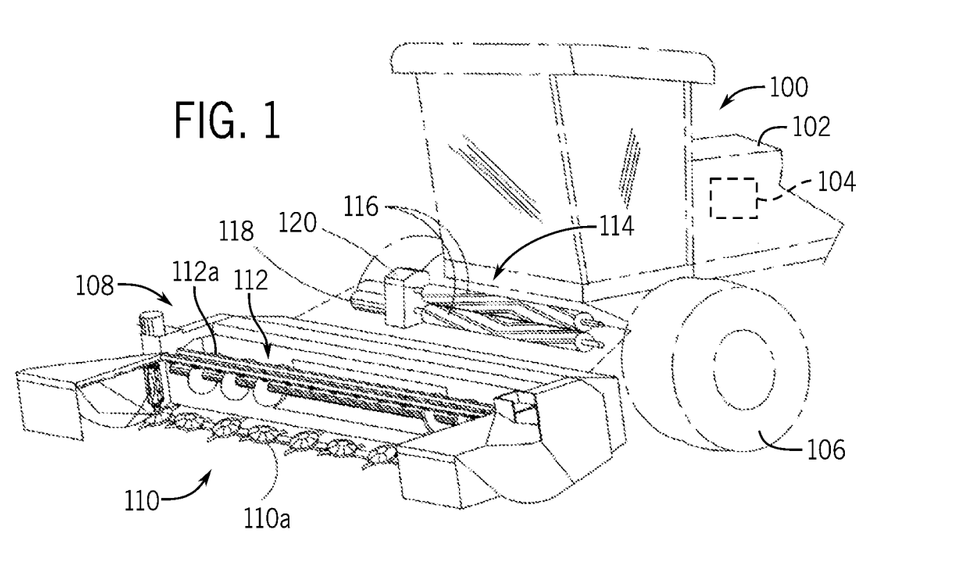
FIG. 1 illustrates an example of a self-propelled agricultural machine having header conditioning roll features such as described herein.

FIG. 1 illustrates a self-propelled agricultural machine 100. The machine 100 may be any type of machine that uses conditioner rolls, such as a mower conditioner, a windrower, or the like. In this case, the machine 100 comprises a self-propelled tractor, having a chassis 102, an engine 104, and powered wheels 106 (e.g., pneumatic tires, tracked wheels, etc.) that are driven by the engine 104 and configured to move the machine 100 across the ground.

A header 108 is attached to the chassis 102, either movably or in a fixed position. The header 108 is configured to process and/or direct crop material into a crop conditioner system 114 having two or more conditioner rolls 116. In this case, the header 108 has, at the forward end, a crop cutter 110 having cutting devices 110a such as one or more cutterbars, cutting discs, sickles, or the like, that are configured to sever standing crop material as the machine 100 moves forward along the ground. Behind the crop cutter 110 there may be belts or augers 112, to move the severed crop material towards the centerline of the header 108, or otherwise redistribute the severed crop material for introduction into the crop conditioner system 114. In other embodiments, one or both of the crop cutter 110 and collecting device may be omitted, or other features may be added. The crop conditioner system 114 is mounted behind the cutting device 110 and belts or augers 112 to receive the incoming flow of cut crop material. The conditioner rolls 116 are driven by a motor 118 via a transmission 120 or other drive arrangement.

Figure 2:
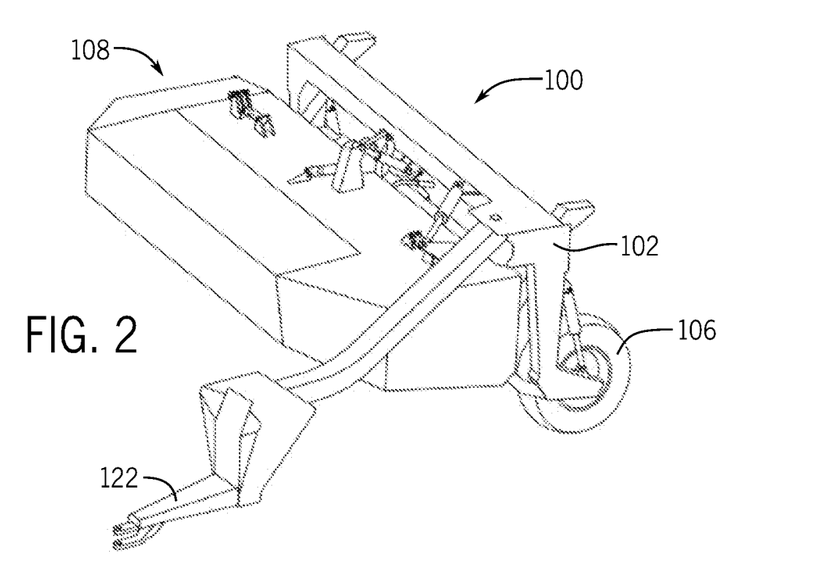
FIG. 2 illustrates an example of a towed agricultural machine having header conditioning roll features such as described herein.

FIG. 2 illustrates an agricultural machine 100 in the form of a pull-type mower conditioner. The pull-type mower conditioner 100 includes a chassis 102 that is supported on the ground by wheels 106, and pulled along the ground by a hitch 122 that connects to a separate tractor. The pull-type mower conditioner 100 also includes a header 108, which includes a crop conditioner system 114 as described in relation to FIG. 1 and may include other operating features.

Various conventional features of the foregoing agricultural machines 100 are omitted from the drawings and this description, but such details will be readily understood by persons of ordinary skill in the art and need no further explanation herein.

Figure 3:
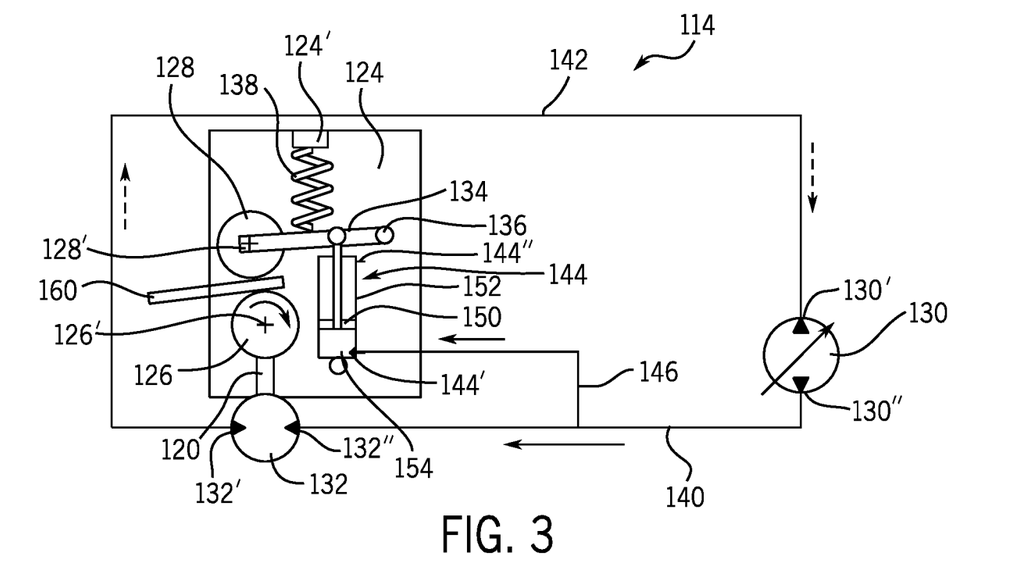
FIG. 3 schematically illustrates a crop conditioning system operating in a forward-driving state.
Figure 4:
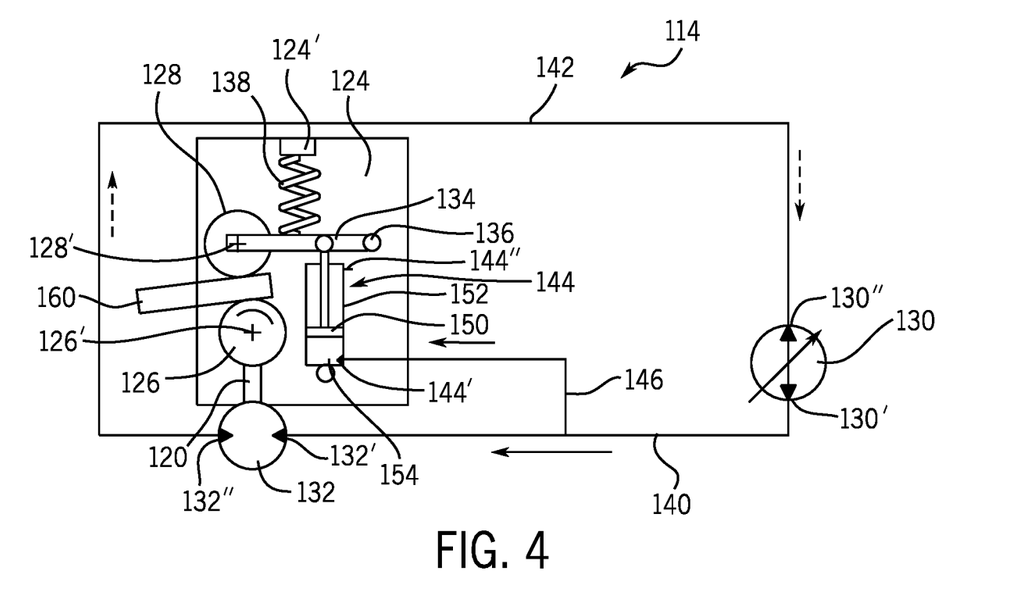
FIG. 4 schematically illustrates the crop conditioning system of FIG. 3, operating in another forward-driving state.

FIGS. 3 and 4 schematically illustrate details of an exemplary crop conditioner system 114. The crop conditioner system 114 generally includes a frame 124, a first conditioner roll 126, a second conditioner roll 128, and a drive circuit having a hydraulic pump 130 and a hydraulic motor 132.

The frame 124 is mounted to, or defined as part of, the header 108. The first and second conditioner rolls 126, 128 are located adjacent to each other and both extend parallel to a common axis that extends perpendicular to the general direction of crop material processing flow. The first conditioner roll 126 is mounted to the frame 124 by bearings, bushings or the like, so as to be rotatable relative to the frame 124 about a first rotation axis 126'. Likewise, the second conditioner roll 128 is mounted to the frame by bearings, bushing or the like, so as to be rotatable relative to the frame 124 about a second rotation axis 128'. The first and second rotation axes 126', 128' are generally parallel to each other, and some variation in their relative orientation can be present by intent or by normal tolerance variations or wear.

The conditioner rolls 126, 128 may have any conventional or otherwise suitable construction for conditioning the crop material. For example, each conditioner roll 126, 128 may comprise a cylindrical body having raised herringbone surfaces that face each other to chop, crush, shear, or otherwise process the crop material. The conditioner rolls 126, 128 also may include intermeshing or gear-like surfaces. Two conditioner rolls 126, 128 are shown in the drawings, but additional conditioner rolls may be provided. Examples of conditioner rolls are shown in United States Patent Pre-Grant Publication Nos. US 2021/0360856 A1 and US 2021/0360857 A1, which are incorporated herein by reference for all purposes. Other alternatives and embodiments will be apparent to persons of ordinary skill in the art in view of the present disclosure.

The second conditioner roll 128 is also movable relative to the frame 124 to change its distance to the first conditioner roll 126. Such motion may be provided by, for example, mounting the second conditioner roll 128 to the frame 124 by a linkage including a rotatable link arm 134 located at each end of the second conditioner roll 128. For simplicity, the rotatable arm 134 is shown as a simple single-bar linkage having a first end rotatably mounted directly to the frame 124 at an arm pivot 136, and a second end holding the second conditioner roll 128. However, the rotatable arm 134 may instead be provided as part of a multi-bar linkage or other types of moving mechanisms. In other cases, the second conditioner roll 128 may be movably mounted to the frame 124 on a sliding gantry or on sliding mounts that hold each end of the second conditioner roll and define a movement path (e.g., linear or curved) of the second conditioner roll 128. The first conditioner roll 126 also may be movable relative to the frame 124 in a manner similar to the second conditioner roll 128. Other alternatives and embodiments will be apparent to persons of ordinary skill in the art in view of the present disclosure.

Figure 5:
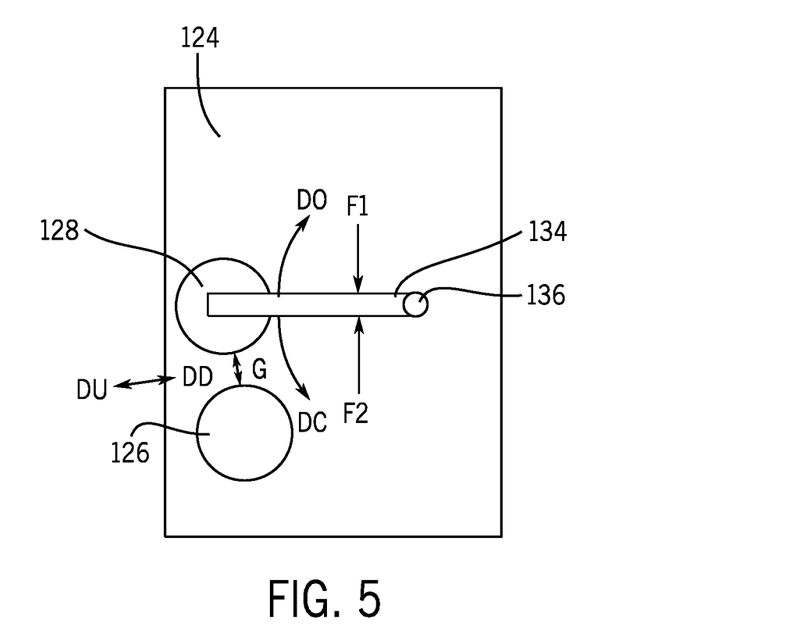
FIG. 5 is a schematic illustration of details of the embodiment of FIGS. 3 and 4, with features removed for clarity.

FIG. 5 shows the embodiment of FIGS. 3 and 4, with various features removed to facilitate a schematic illustration of the forces, movements and other aspects of the system. As shown in FIG. 5, the second conditioner roll 128 is movable relative to the frame 124 (e.g., by rotation of the link arm 134 about the pivot 136) in a closing direction DC to decrease a size of a gap G between the first conditioner roll 126 and the second conditioner roll 128, and an opening direction DO (opposite the closing direction DC) to increase the size of the gap G. The gap G defines the opening through which crop material is processed. A travel stop (not shown) may be included to limit the maximum size of the gap G. In normal operation, the crop material moves between the first and second conditioner rolls 126, 128 in a downstream processing direction DD, and in a reverse operation, the crop material moves between the first and second conditioner rolls 126, 128 in an upstream direction DU that is opposite the downstream direction DD.

The gap G may be measured in various ways. In the shown example, the gap G is a distance between the outermost radial surfaces of the first conditioner roll 126 and the second conditioner roll 128. The gap G could also be defined as a distance between the first and second rotation axes 126', 128', or in other ways. The manner in which the gap G is defined in a particular application is not relevant.

Referring back to FIGS. 3 and 4, a tensioner 138 is provided to generate a first force F1 that biases the second conditioner roll 128 in the closing direction DC. The total magnitude of forces that bias the conditioner roll 128 in the closing direction DC includes the first force F1 provided by the tensioner 138, as well as forces generated by gravity on the parts or by dynamic operation of the parts (e.g., driveline chain tension) and so on.

The tensioner 138 may be any suitable or conventional device. Examples of tensioners in the form of hydraulically-positioned torsion bars attached to a conditioner roll by lever links are shown in United States Patent Pre-Grant Publication Nos. US 2021/0360856 A1 and US 2021/0360857 A1, which are incorporated herein by reference for all purposes. In these references, the tensioner 138 comprises a mechanical spring in the form of a torsion bar with a hydraulic preload actuator. In FIGS. 3 and 4, the tensioner 138 is a coil spring. Other mechanical springs, such as leaf springs, may be used on other cases. In still other cases, such as exemplified in FIG. 7, the tensioner 138 may comprise a pneumatic spring comprising a hydraulic tensioner actuator 138' having a gas-charged accumulator 138" to allow the hydraulic tensioner actuator 138' to resiliently reverse direction by compressing the gas in the accumulator 138". The tensioner 138 is operatively connected between the frame 124 and the second conditioner roll 128 by any suitable linkage, direct connection, or the like. Any operative connection in which the tensioner 138 applies the first force F1 to bias the second conditioner roll 128 in the closing direction DC may be used. Examples of linkages are provided in the references identified immediately above. FIGS. 3 and 4 show the tensioner 138 connected to the frame 124 at a frame mount 124', and to the second conditioner roll 128 by way of the rotatable arm 134. The frame mount 124' optionally may be repositionable to vary the preload on the tensioner 138 and thus modulate the first force F1. One or more tensioners 138 may be used. For example, a single tensioner 138 may be provided in the form of a torsion bar that connects to each end of the second conditioner roll 128 by linkages, or individual tensioners 138 may be provided at each end of the second conditioner roll 128. Other alternatives and embodiments will be apparent to persons of ordinary skill in the art in view of the present disclosure.

As noted above, the crop conditioner system 114 also includes a drive circuit having a hydraulic pump 130 and a hydraulic motor 132. The hydraulic pump 130 is connected to a source of hydraulic fluid (not shown) in a conventional manner, and may be driven by any suitable motive force. For example, the hydraulic pump 130 may be powered by an internal combustion engine (e.g., a dedicated engine or by a multi-purpose engine such as an engine 104 that also drives ground wheels 106), an electric motor, or the like. In some cases, the hydraulic pump 130 may be powered by a power take-off that is driven by the engine 104 via a transmission (e.g., a gearbox, drive chains and sprockets, etc.), or the hydraulic pump 130 may be driven by pressurized hydraulic fluid provided by a separate hydraulic pump that is powered by the engine 104. Other alternatives and embodiments will be apparent to persons of ordinary skill in the art in view of the present disclosure.

The hydraulic pump 130 has a forward pump outlet 130' and a reverse pump outlet 130". The hydraulic pump 130 may be configured to generate a reversible flow of pressurized hydraulic fluid, and is described as such herein, but this is not strictly required, and other embodiments may have a unidirectional hydraulic pump that operates only in a forward direction. A reversible flow may be provided in various ways. For example, a reversible flow may be provided by reversing the hydraulic pump's 130 rotation direction (e.g., via a reversing valve arrangement). As another example, a reversing valve may be used to redirect the output flow of a single-direction pump. As another example, a variable output mechanism such as a swashplate may be used to generate a reverse flow without necessarily changing the hydraulic pump's 130 rotation direction. As another example, two single-direction pumps may be provided to generate opposite flows with their output being regulated by flow control valves. For purposes of this disclosure, the exact construction of the hydraulic pump 130 is not important.

When operating in a forward flow direction, the hydraulic pump 130 expels high-pressure hydraulic fluid out of the forward pump outlet 130', and pulls low-pressure hydraulic fluid in though the reverse pump outlet 130". When operating in a reverse flow direction, the hydraulic pump 130 expels high-pressure hydraulic fluid out of the reverse pump outlet 130", and pulls low-pressure hydraulic fluid in though the forward pump outlet 130'. In either case, the pressure of the hydraulic fluid exiting the hydraulic pump 130 is greater than the pressure of the hydraulic fluid returning to the hydraulic pump 130. The relative pressures are schematically illustrated in the drawings by showing high pressure flow with solid line arrows, and low pressure flow with dashed line arrows.

The hydraulic motor 132 is operatively connected to one or more of the conditioner rolls 126, 128. For example, the hydraulic motor 132 may be directly connected to drive the first conditioner roll 126, and a separate hydraulic pump (not shown) may be provided to drive the second conditioner roll 128. As another example, the hydraulic motor 132 may be connected by a transmission (e.g., a gearbox, drive chains and sprockets, etc.) to both the first conditioner roll 126 and the second conditioner roll 128 to drive them in unison. Other alternatives and embodiments will be apparent to persons of ordinary skill in the art in view of the present disclosure.

The hydraulic motor 132 has a forward motor inlet 132' and a reverse motor inlet 132". A forward supply line 140 hydraulically connects the forward pump outlet 130' to the forward motor inlet 132', and a reverse supply line 142 hydraulically connects the reverse pump outlet 130" to the reverse motor inlet 132". The supply lines 140, 142 may comprise any suitable hydraulic fluid passage (flexible hoses, rigid conduits, etc.).

FIG. 3 shows the hydraulic pump 130 operating in the forward processing direction. In this state, high pressure hydraulic fluid moves through the forward supply line 140 from the forward pump outlet 130' to the forward motor inlet 132'. The high pressure hydraulic fluid drives the hydraulic pump 132 in the forward processing direction to thereby drive the first conditioner roll 126 in the forward direction as shown by the arrow. Low pressure hydraulic fluid moves through the reverse supply line 142 from the reverse motor inlet 132" to the reverse pump outlet 130".

During forward processing, the conditioner rolls 126, 128 draw in a mat of crop material 160. The thickness of the mat 160 varies depending on various factors, including the volumetric flow rate of the crop material 160 and the magnitude of the first force F1 generated by the tensioner 138. In general cases, the tensioner 138 is set at a preload value at the beginning or crop processing, and not changed until processing stops. Thus, as the volumetric flow rate of the crop material 160 increases, the load on the hydraulic pump 130 increases, due to the increased torque requirement to fight the tensioner 138 and friction to pull the crop material 160 into the gap G between the conditioner rolls 126, 128. The inverse is also true—i.e., reductions in the volumetric flow rate of the crop material 160 lead to a reduced load on the hydraulic pump 130. Thus, the load on the hydraulic pump 130 is variable as an increasing function of the volumetric flow rate of the crop material 160 into the gap G. For the same reason, the pressure of the hydraulic fluid in the forward supply line 140 is also variable as an increasing function of the volumetric flow rate of the crop material 160 into the gap G, and a greater magnitude of hydraulic pressure is required to continue operating the conditioner rolls 126, 128 to ingest a larger volumetric flow rate of crop material 160, and a smaller magnitude of hydraulic pressure is necessary to ingest a smaller volumetric flow rate of crop material 160.

The inventors have determined that these variations in the hydraulic pressure in the forward supply line 140 might be advantageously used to help modulate the first force F1 generated by the tensioner 138, to help better process the crop material 160. This may be accomplished in various ways, as explained in the following examples.

The exemplary embodiment of FIGS. 3 and 4 includes one or more hydraulic actuators 144 that are provided to take advantage of hydraulic pressure variations in the forward supply line 140 to apply a second force F2 (see FIG. 5) that counteracts the first force F1, to alleviate the pressure applied on the crop material 160 by the first and second conditioner rolls 126, 128. Upon doing so, the second conditioner roll 128 is more freely movable away from the first conditioner roll 126 to open the gap G and allow a thicker mat of crop material 160 to be processed through the crop conditioner system 114. This operation is illustrated in FIG. 4, which shows the system of FIG. 3 receiving a larger volumetric flow rate of crop material 160.

The hydraulic actuator 144 is operatively connected between the frame 124 and the second conditioner roll 128. The hydraulic actuator 144 may be, for example, a single-acting linear actuator having a piston 150 that is telescopically movable within a cylinder 152 to define a variable-size chamber 154. The hydraulic actuator 144 has an actuator inlet 144' that is operatively connected to the forward supply line 140 by a hydraulic passage 146, and an actuator outlet 144" that is vented to atmospheric pressure directly or via an unpressurized hydraulic reservoir. The hydraulic passage 146 may be any passage suitable to convey hydraulic fluid from the forward supply line 140 to the actuator inlet 144', such as a flexible hose or rigid conduit. The hydraulic passage 146 may be uninterrupted (i.e., a passage that is always open), or it may include one or more valves 148 or other hydraulic controls, as explained below. While a linear actuator is preferred, other types of hydraulic actuator may be used in other embodiments. For example, other embodiments may use a rotary hydraulic actuator, such as a travel-limited unidirectional hydraulic motor or the like.

The actuator inlet 144' leads to a variable-volume piston chamber 154 in which pressurized hydraulic fluid acts on the piston 150 to generate a force to expand the piston 150 telescopically from the cylinder 152. The opposite side of the piston 150 may be open to atmospheric pressure via the actuator outlet 144". In operation, the hydraulic fluid within the variable-volume piston chamber 154 is maintained at essentially the same pressure as the hydraulic fluid passing through the forward supply line 140 from the hydraulic pump 130 to the hydraulic motor 132 (assuming any valve or the like in the hydraulic passage 146 is open). Thus, any variations in the hydraulic pressure caused by a change in the volumetric flow rate of the crop material 160 (or other variables, such as crop material density or the like) are transmitted to the hydraulic actuator 144.

The hydraulic actuator 144 may be operatively connected to the rest of the system in any way that converts the force generated by the hydraulic pressure into a second force F2 that reduces the first force F1. In this case, the piston 150 is connected to the rotatable arm 134, and the cylinder is connected to the frame 124, but other arrangements may be used.

The properties of the hydraulic actuator 144 (or actuators), such as the surface area of the piston 150, can be selected to control the magnitude of the second force F2 as a function of the hydraulic pressure. For example, increasing the diameter of the cylinder 152 increases the hydrostatic force on the piston 150, and thus increases the second force F2 for a given hydraulic pressure within the forward supply line 140 and the piston chamber 154. Such principles are well-known in the art of hydraulic system design, and need not be explained in further detail herein.

In use, the hydraulic actuator 144 generates the second force F2 in opposition to the first force F1, as shown in FIG. 5. In a steady state operation (i.e., there are no changes in the properties of the crop material 160 and other variables affecting pressure in the forward supply line 140), these two forces F1, F2 balance into a closing force that biases the second conditioner roll 128 towards the first conditioner roll 126 to compress and process the crop material 160 as it passes through the gap G. When a variable changes, the system will change to a corresponding different equilibrium state. For example, when the volumetric flow rate of the crop material 160 increases, the pressure in the forward supply line 140 increase, resulting in a larger second force F2 and a smaller total compressing force on the crop material 160. Thus, the changes in the crop material properties can be used to change the operating state of the crop conditioner system 114 to better process the crop material 160.

The embodiment of FIGS. 3 and 4 has an uninterrupted hydraulic passage, and therefore the pressurized fluid in the forward supply line 140 acts on the hydraulic actuator 144 at all times. In other cases, it may be desirable to include valves or other controls to regulate the operation of the hydraulic actuator 144. For example, a pressure reducing valve 148 (see FIG. 6), may be included in the hydraulic passage 146. The pressure reducing valve 148 may be used to control the magnitude of the hydraulic pressure in the hydraulic actuator 144 to be less than the pressure in the forward supply line 140. Any of a variety of controls or settings may be used for the pressure reducing valve 148. In other cases, the valve 148 may comprise a pressure relief valve to limit a maximum value of the hydraulic pressure in the cylinder 144. In this case, the maximum value may be selected based on various criteria. For example, the maximum value may be selected as a value to ensure that the hydraulic actuator 144 does not generate a second force F2 that is high enough to move the second conditioner roll 128 away from the first conditioner roll 126 in the absence of crop material 160 (i.e., so that the second force F2 does not overcome a combined magnitude of forces biasing the second conditioner roll 128 in the closed direction DC). In still other cases, the valve 148 may comprise a shutoff valve that can be used to lock the hydraulic actuator 144 in a fixed position regardless of changes in the hydraulic pressure in the forward supply line 140.

In any of the foregoing embodiments, the valve 148 or valves may be configured to be controlled manually by the operator at the valve or by a remote control. The valves 148 also may be configured to be controlled automatically by a suitable control system (not shown). Additionally, while the foregoing examples schematically show valves 148 located in the hydraulic passage 146 at a location separate from the hydraulic actuator 144, it will be understood that the valve 148 may be located at any location at which it controls the hydrostatic connection between the hydraulic actuator 144 and the revers supply line. For example, a valve 148 may be integrated into the body of the hydraulic actuator 144. Other alternatives and embodiments will be apparent to persons of ordinary skill in the art in view of the present disclosure.

Figure 6:
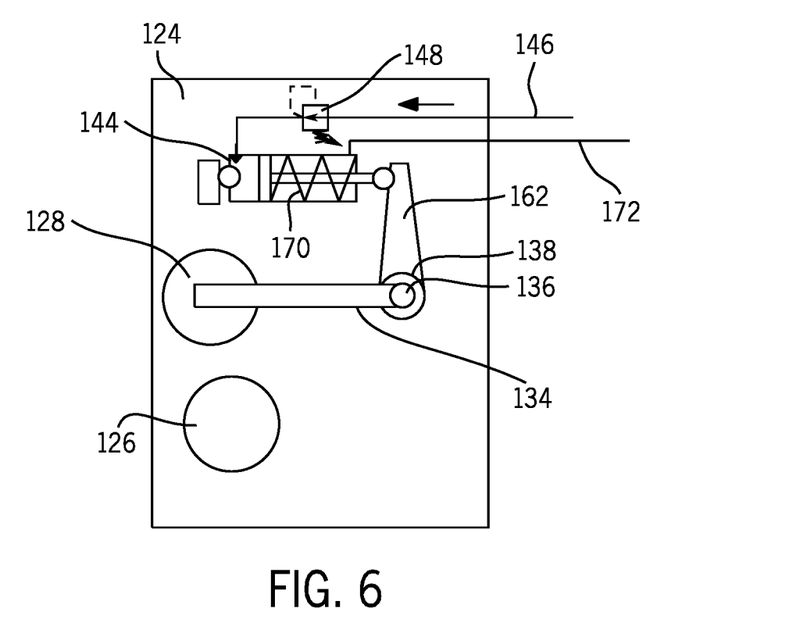
FIG. 6 is a schematic illustration of another embodiment of portions of a crop conditioning system.

FIG. 6 shows an example of a crop conditioner system 114 having a different arrangement for the hydraulic actuator 144. In this case, the second conditioner roll 128 is mounted on an arm 134 that is mounted to the frame 124 to rotate about a pivot 136, and the tensioner 138 comprises a torsion spring in the form of, for example, a torque tube that extend along the second conditioner roll. Non-limiting examples of this type of structure are shown in United States Patent Pre-Grant Publication Nos. US 2021/0360856 A1 and US 2021/0360857 A1, which are incorporated herein by reference for all purposes. A control arm 162 is rigidly fixed to the torsion spring 138, such that rotation of the control arm 162 regulates the amount of torque applied by the torsion spring 138 to the arm 134. The hydraulic actuator 144 is operatively connected between the frame 124 and the control arm 162. The hydraulic actuator 144 is positioned such that it applies a force to move the control arm 162 to reduce the torque applied by the torsion spring 138 on the arm 134. Thus, as the pressure in the forward supply line 140 increases, the hydraulic actuator 144 acts on the control arm 162 to reduce the torque, and thus reduce the magnitude of the first force F1. When the pressure in the forward supply line 140 reduces, a return spring 170 contracts the piston which moves the control arm 162 in a direction to apply more torque to the rotating arm 134. Thus, the return spring 170 may acts as a part of the tensioner 138. As noted above, a pressure reducing valve 148 or the like may be included in the crop conditioner system 114, but this is not required.

The embodiment of FIG. 6 also may be configured to generate a reversing force on existing tensioner actuator. For example, the hydraulic actuator 144 shown in FIG. 6 may be a pre-existing tensioner actuator (see, e.g., the references cited immediately above). In this case, the hydraulic actuator 144 may be provided as a double-acting actuator having an inlet on one side of the piston connected to a hydraulic system for increasing the torque applied by the torsion spring 138, and another inlet on the other side of the piston connected to the forward supply line 140 to generate a pressure to counter the pressure provided on the other side of the piston. Other alternatives and embodiments will be apparent to persons of ordinary skill in the art in view of the present disclosure.

Figure 7:
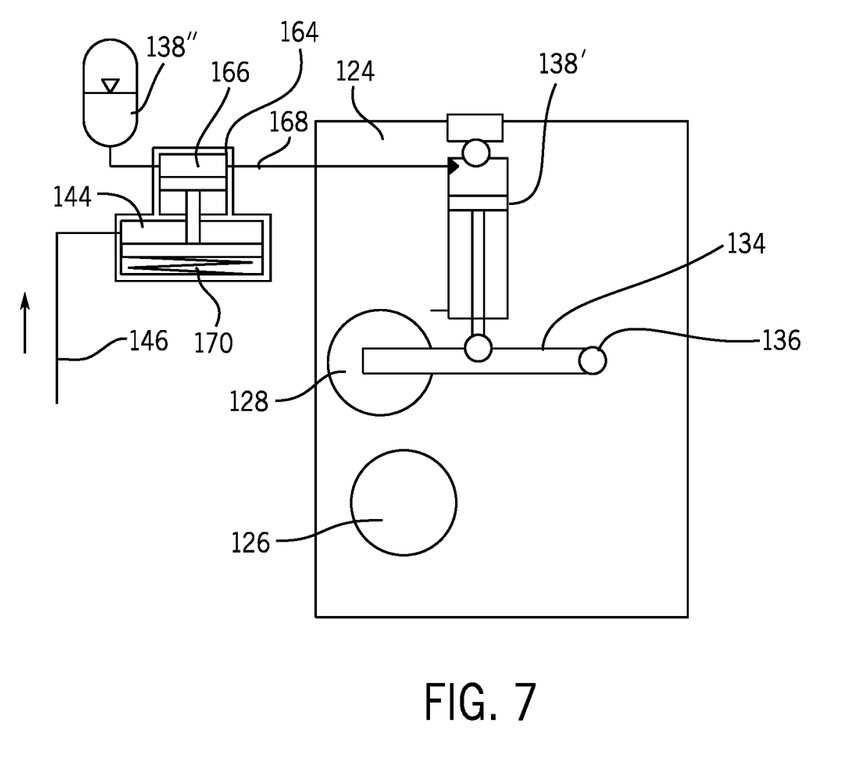
FIG. 7 is a schematic illustration of another embodiment of portions of a crop conditioning system.

FIG. 7 shows another embodiment of a hydraulic actuator 144 that selectively reduces the first force F1 as the pressure in the forward supply line 140 increases, but without generating an opposing first force F1. In this case, the hydraulic actuator comprises a piston and cylinder arrangement that is connected to a slave actuator 164 in the form of another piston and cylinder arrangement. The piston and cylinder of the slave actuator 164 define a variable-volume reservoir 166. Movement of the hydraulic actuator 144 causes the volume of the reservoir 166 to increase when the pressure in the forward supply line 140 increases, and decrease when the pressure in the forward supply line 140 decreases. As noted above, the tensioner 138 is provided in the form of a pneumatic spring comprising a hydraulic tensioner actuator 138' having a gas-charged accumulator 138" to allow the hydraulic tensioner actuator 138' to resiliently reverse direction by compressing the gas in the accumulator 138".

The reservoir 166 of the slave actuator 164 is located in the hydraulic circuit 168 joining the actuator 138' to the accumulator 138", and is filled with hydraulic fluid. The volume of hydraulic fluid in the accumulator 138" changes as the volume of the reservoir 166 changes. Specifically, as the reservoir 166 increases in volume, it draws hydraulic fluid out of the accumulator 138" and into the reservoir 166. Alternatively, when the reservoir 166 decreases in volume, it directs more hydraulic fluid into the accumulator 138". The spring constant of the accumulator 138" changes as a function of the gas volume; as the gas volume increases, the spring constant drops, and as the gas volume decreases, the spring constant increases. Thus, when the pressure of the hydraulic fluid in the forward supply line 140 increases, the volume of the reservoir 166 increases, thereby increasing the volume of gas in the accumulator 138" and reducing its effective spring constant, and decreasing the magnitude of the force F1 generated by the tensioner 138. Conversely, when the pressure of the hydraulic fluid in the forward supply line 140 decreases, the volume of the reservoir 166 decreases, thereby decreasing the volume of gas in the accumulator 138" and increasing its effective spring constant to increase the magnitude of the force F1 generated by the tensioner 138.

As shown in FIG. 7, the hydraulic actuator 144 and slave actuator 164 may be configured to have different effective surface areas, to thereby reduce back-driving of the hydraulic actuator 144 by the hydraulic fluid in the tensioner 138, but other arrangements may be used. Also, the hydraulic actuator 144 is illustrated with a return spring 170, but this also is not required or other arrangements may be used. Other alternatives and embodiments will be apparent to persons of ordinary skill in the art in view of the present disclosure.

The present disclosure describes a number of inventive features and/or combinations of features that may be used alone or in combination with each other or in combination with other technologies. Such features may be used in any useful combination, and the appearance of a particular feature in combination with another particular feature in the embodiments is not intended to suggest that such features cannot be used in alternative combinations with other features. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. Also, features identified in the singular or by a specific number are not intended to be limited to a single features or the described number of features unless specifically recited as being present only in the specified quantity.

The invention claimed is:

1. An agricultural crop conditioner comprising:
   a frame;
   a first conditioner roll rotatably mounted to the frame;
   a second conditioner roll rotatably mounted to the frame and extending adjacent to the first conditioner roll, wherein the second conditioner roll is movable relative to the frame in a closing direction to decrease a size of a gap between the first conditioner roll and the second conditioner roll, and an opening direction to increase the size of the gap;
   a tensioner operatively connected between the frame and the second conditioner roll, and configured to generate a first force to bias the second conditioner roll in the closing direction;
   a conditioner roll drive circuit comprising:
      a hydraulic pump having a forward pump outlet and a reverse pump outlet,
      a hydraulic motor operatively connected at least one of the first conditioner roll and the second conditioner roll, and having a forward motor inlet and a reverse motor inlet,
      a forward supply line hydraulically connecting the forward pump outlet to the forward motor inlet, and
      a reverse supply line hydraulically connecting the reverse pump outlet to the reverse motor inlet,
      wherein the hydraulic pump is operable to drive the hydraulic motor in a forward processing direction to process crop material through the crop conditioner; and
   a hydraulic actuator having an actuator inlet operatively connected to the forward supply line, wherein the hydraulic actuator is configured to change the first force as an inverse function of changes in a pressure of hydraulic fluid in the forward supply line during operation of the hydraulic motor in the forward processing direction.

2. The agricultural crop conditioner of claim 1, wherein the pressure of hydraulic fluid in the forward supply line is variable as an increasing function of a volumetric flow rate of crop material into the gap.

3. The agricultural crop conditioner of claim 1, wherein the hydraulic actuator comprises a linear hydraulic actuator.

4. The agricultural crop conditioner of claim 1, wherein the hydraulic actuator is operatively connected to the second conditioner roll and configured to apply a second force to bias the second conditioner roll in the opening direction.

5. The agricultural crop conditioner of claim 4, wherein:
   the second conditioner roll is movably mounted to the frame on a linkage comprising a rotatable arm;
   the tensioner is operatively connected to the rotatable arm to apply the first force against the rotatable arm; and
   the hydraulic actuator is operatively connected to the rotatable arm to apply the second force against the rotatable arm in contradiction to the first force.

6. The agricultural crop conditioner of claim 4, wherein:
   the second conditioner roll is movably mounted to the frame on a linkage comprising a rotatable arm;
   the tensioner comprises a torsion spring having a first end fixed to the rotatable arm and a second end fixed to a lever arm; and
   the hydraulic actuator is operatively connected to the lever arm to apply the second force against the lever arm.

7. The agricultural crop conditioner of claim 4, wherein the pressure of the hydraulic fluid in the forward supply line is variable up to a maximum value, and the second force is selected to be insufficient to move the second conditioner roll away from the first conditioner roll against the first force when the pressure of the hydraulic fluid in the forward supply line at the maximum value.

8. The agricultural crop conditioner of claim 1, wherein the tensioner comprises at least one mechanical spring.

9. The agricultural crop conditioner of claim 1, wherein:
   the tensioner comprises a hydraulic telescoping piston and cylinder assembly operatively connected in a telescoping manner to the second conditioner roll, a gas-charged accumulator in fluid communication with an expandable chamber of the piston and cylinder assembly, and a hydraulic fluid reservoir in fluid communication with the accumulator and the expandable chamber; and
   the hydraulic actuator is operatively connected to the reservoir and configured to change a volume of the reservoir as a function of changes in the pressure of the hydraulic fluid in the forward supply line.

10. The agricultural crop conditioner of claim 1, wherein the actuator inlet is operatively connected to the forward supply line by an uninterrupted hydraulic passage.

11. The agricultural crop conditioner of claim 1, further comprising one or more valves operatively connected to the hydraulic actuator and configured to modulate the second force.

12. The agricultural crop conditioner of claim 11, wherein the one or more valves comprises a pressure reducing valve.

13. An agricultural machine comprising:
    a chassis;
    one or more wheels configured to support the chassis for movement on a ground surface; and
    an agricultural crop conditioner mounted on the chassis and comprising:
       a frame;
       a first conditioner roll rotatably mounted to the frame;
       a second conditioner roll rotatably mounted to the frame and extending adjacent to the first conditioner roll, wherein the second conditioner roll is movable relative to the frame in a closing direction to decrease a size of a gap between the first conditioner roll and the second conditioner roll, and an opening direction to increase the size of the gap;
       a tensioner operatively connected between the frame and the second conditioner roll, and configured to generate a first force to bias the second conditioner roll in the closing direction;
       a conditioner roll drive circuit comprising:
          a hydraulic pump having a forward pump outlet and a reverse pump outlet,
          a hydraulic motor operatively connected at least one of the first conditioner roll and the second conditioner roll, and having a forward motor inlet and a reverse motor inlet,
          a forward supply line hydraulically connecting the forward pump outlet to the forward motor inlet, and
          a reverse supply line hydraulically connecting the reverse pump outlet to the reverse motor inlet, wherein the hydraulic pump is operable to drive the hydraulic motor in a forward processing direction to process crop material through the crop conditioner; and a hydraulic actuator having an actuator inlet operatively connected to the forward supply line, wherein the hydraulic actuator is configured to change the first force in proportion to changes in a pressure of hydraulic fluid in the forward supply line during operation of the hydraulic motor in the forward processing direction.

14. The agricultural machine of claim 13, further comprising a motor supported on the chassis and configured to drive the wheels to move the chassis along the ground.

15. A method for operating an agricultural crop conditioner comprising:
   a frame;
   a first conditioner roll rotatably mounted to the frame;
   a second conditioner roll rotatably mounted to the frame and extending adjacent to the first conditioner roll, wherein the second conditioner roll is movable relative to the frame in a closing direction to decrease a size of a gap between the first conditioner roll and the second conditioner roll, and an opening direction to increase the size of the gap;
   a tensioner operatively connected between the frame and the second conditioner roll, and configured to generate a first force to bias the second conditioner roll in the closing direction;
   a conditioner roll drive circuit comprising:
      a hydraulic pump having a forward pump outlet and a reverse pump outlet,
      a hydraulic motor operatively connected at least one of the first conditioner roll and the second conditioner roll, and having a forward motor inlet and a reverse motor inlet,
      a forward supply line hydraulically connecting the forward pump outlet to the forward motor inlet, and
      a reverse supply line hydraulically connecting the reverse pump outlet to the reverse motor inlet,
      wherein the hydraulic pump is operable to drive the hydraulic motor in a forward processing direction to process crop material through the crop conditioner; and
   a hydraulic actuator having an actuator inlet operatively connected to the forward supply line, wherein the hydraulic actuator is configured to change the first force in proportion to changes in a pressure of hydraulic fluid in the forward supply line during operation of the hydraulic motor in the forward processing direction;
   wherein the method comprises:
      operating the hydraulic pump in the forward processing direction to rotate at least one of the first conditioner roll and the second conditioner roll to condition a flow of crop material moving in a downstream direction;
      applying the first force by the tensioner to bias the second conditioner roll in the closing direction; and
      operating the hydraulic actuator to inversely vary the first force as a function of a volumetric flow rate of the crop material.

* * * * *